H. LEVY.
FISH LINE RELEASER.
APPLICATION FILED MAR. 27, 1912.
1,044,792.
Patented Nov. 19, 1912.
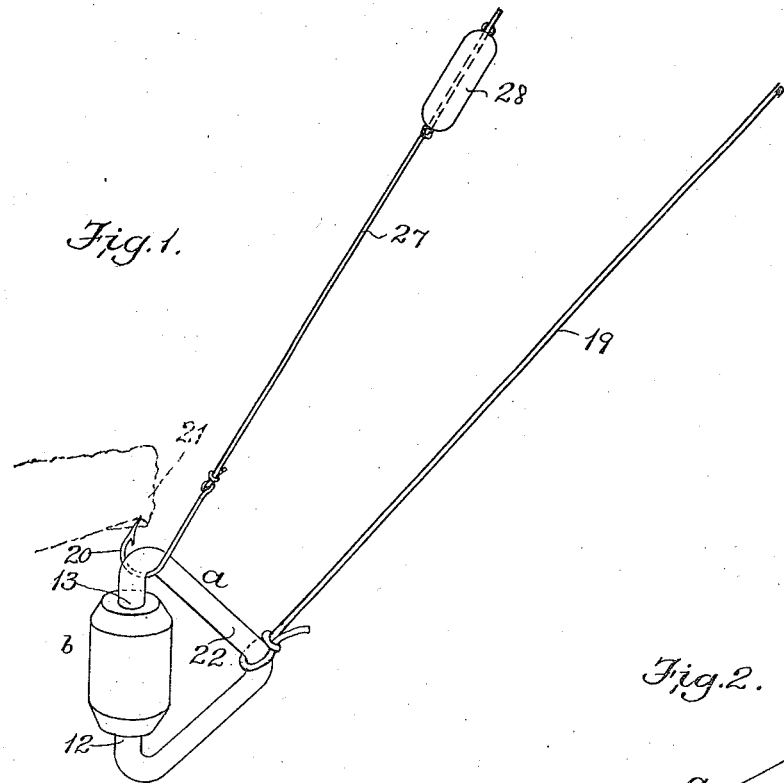
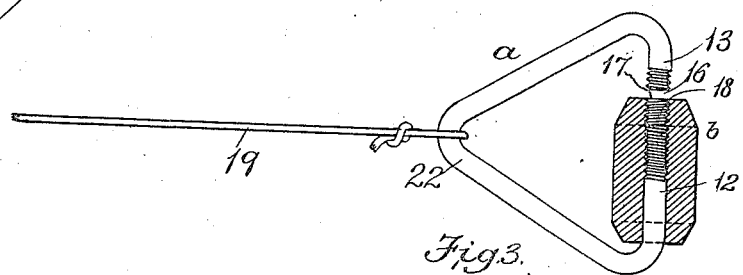
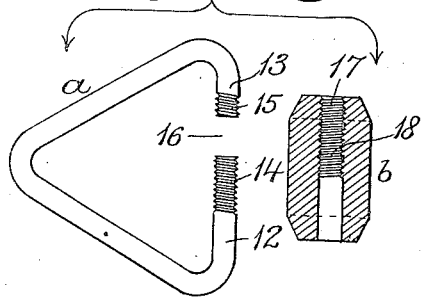
Witnesses
P. W. Pezzetti
G. L. Johnson
Inventor:
Harry Levy
by Wright Brown Quimby May
Attys

UNITED STATES PATENT OFFICE.

HARRY LEVY, OF BOSTON, MASSACHUSETTS.

FISH-LINE RELEASER.

1,044,792.  Specification of Letters Patent.  Patented Nov. 19, 1912.

Application filed March 27, 1912. Serial No. 686,631.

*To all whom it may concern:*

Be it known that I, HARRY LEVY, a citizen of the United States, residing at Boston, in the county of Suffolk and State of Massachusetts, have invented certain new and useful Improvements in Fish-Line Releasers, of which the following is a specification.

This invention relates to a device for detaching a fish hook from a submerged obstruction, the device being embodied in a weight or hammer adapted to slide on an approximately vertical fishing line and to strike the submerged hook thereon with considerable force, calculated to drive the barb of the hook downwardly and detach it from an obstruction, a controlling cord being attached to the device whereby it may be recovered after detaching the hook, or caused to break the line at a point near the hook if the latter is not detachable, the line being released in either case.

The invention has for its object to provide an improved device of this character having certain desirable characteristics hereinafter described.

The invention consists in the improvements which I will now proceed to describe and claim.

Of the accompanying drawings: Figure 1 represents a perspective view of a line releaser embodying my invention. Fig. 2 represents a side view of the same, the weight being shown in section and adjusted to expose the line-receiving opening. Fig. 3 represents in separate views the two parts of the releaser, one of the parts being shown in elevation and the other in section.

The same reference characters indicate the same parts in all the figures.

My improved hook detacher comprises a looped bar $a$ preferably composed of a length of stout wire, and a weight or hammer $b$ which is preferably of cylindrical form, the said parts being preferably made of brass or other suitable metal. The end portions 12 and 13 of the looped bar are straight and in alinement with each other, and have external screw threads 14 and 15 respectively. Said end portions are separated by an opening 16 through which a fish line 27 may be inserted in the loop. The weight $b$ is provided with a longitudinal opening 17 having an internal screw thread 18 adapted to engage the threads 14 and 15 and thus rigidly connect or couple together the end portions 12 and 13 and cover the opening 16 when the weight is adjusted, as shown by Fig. 1, the device comprising the looped bar and weight being thus converted into a continuous loop adapted to slide on a fish line. The weight $b$ is adapted to be adjusted longitudinally to the position shown by Fig. 2 by rotating it on the end portion 12, the screw thread connection between the parts causing an endwise movement of the weight and removing the weight sufficiently from the opening 16 to expose a portion of the latter sufficiently to permit insertion of a fish line.

19 represents a controlling cord attached at one end to the looped bar $a$, the cord being of sufficient length to be held by an angler at a distance from a submerged fish hook 20 which may have been engaged with a submerged obstruction 21, as indicated by Fig. 1.

The looped bar $a$ preferably has approximately the form of an equilateral triangle of which the end portions 12 and 13 form one of the sides.

The angle or angular portion 22 of the bar opposite the side formed by the end portions 12 and 13 is adapted to confine the attached end of the controlling cord 19 at a point opposite the opening 16 so that when the closed releaser is applied to a fishing line and allowed to slide downwardly thereon, the controlling cord 19 may be held by the operator in such manner as to cause the weight $b$ to hang downwardly from the hook 20, as indicated by Fig. 1.

When the hook has been caught by a submerged obstruction, the angler opens the releaser by adjusting the weight as shown by Fig. 2, applies it to the line, then adjusts the weight to close the opening 16, and finally allows the releaser to slide downwardly upon the line. When the releaser reaches the bend of the hook 20 one of the angles of the looped bar at one end of the weight strikes the bend of the hook usually with sufficient force to detach the hook from the obstruction, the weight hanging vertically and advantageously exerting on the hook the force due to its momentum in sliding downwardly. If the hook is not released by the described operation, the releaser may be pulled inwardly by the angler with sufficient force to break the line at a point near the hook, thus reducing to the minimum the loss of line material.

The straight or screw threaded end portions of the looped bar and the internally threaded weight enable the end portions of the bar to be firmly coupled together so that there is no liability of their separation by a pull exerted on the cord 19.

I prefer to form the internal thread 18 in one end portion only of the opening 17, the opposite end portion being smooth or unthreaded, as indicated by Fig. 3.

While I consider the triangular form of the looped bar desirable, I do not limit myself thereto and may make the portion of the bar which connects the ends 12 and 13 of any other suitable form. The triangular form of the looped bar is also desirable because its angles at the ends of the weight are adapted to catch on a sinker 28 attached to the fish line near the hook, and cause the breakage of the line below the sinker in case the hook is not detachable from the obstruction.

The construction of the device is such that it presents no sharp edges or angles liable to scrape the enamel from a fish line.

I claim:

1. A device of the character stated comprising a looped bar having straight screw-threaded end portions in alinement with each other and separated by an opening, and an internally threaded weight longitudinally adjustable on the straight end portions of the bar to expose and cover said opening and adapted to engage the threads on the end portions to couple said portions together, the bar being formed approximately as an equilateral triangle, having a side which is formed by the straight end portions, and a cord-engaging angle opposite said side.

2. A device of the character stated comprising a bar bent to form a plurality of angles, one of the sides of the loop being open between two of said angles, and a weight adjustable upon the open side and adapted to obstruct and expose said opening, the ends of the weight being in close proximity to the adjacent angles and adapted to coöperate therewith in breaking a fish line, substantially as set forth.

In testimony whereof I have affixed my signature, in presence of two witnesses.

HARRY LEVY.

Witnesses:
C. F. BROWN,
C. S. KIMBALL.